TELEVISION CONTROL SYSTEM

Filed July 1, 1953

2 Sheets-Sheet 1

INVENTORS
ARCH C. LUTHER, JR.
ROY J. MARIAN &
IRVING BOSINOFF
BY [signature]
ATTORNEY INVENTORS
ARCH C. LUTHER, JR.
ROY J. MARIAN &
IRVING BOSINOFF
BY [signature]
ATTORNEY

United States Patent Office 2,890,276

Patented June 9, 1959

2,890,276

TELEVISION CONTROL SYSTEM

Arch C. Luther, Jr., Merchantville, Roy J. Marian, Mount Ephraim, and Irving Bosinoff, Haddon Heights, N.J., assignors to Radio Corporation of America, a corporation of Delaware Application July 1, 1953, Serial No. 365,438

The terminal fifteen years of the term of the patent to be granted has been disclaimed 8 Claims. (Cl. 178—7.1)

This invention relates to means for compensating shading effects and controlling black level in a television camera.

In an iconoscope type of pickup tube, the mosaic or photo sensitive element is exposed to a given image, and this image converted to an electrical signal by virtue of an electronic beam scanning the mosaic. It is also a factor of these types of systems that the scanning of the mosaic gives rise to a spurious signal which depends on the illumination of the mosaic, the characteristic of the particular iconoscope tube, and the particular scanning action itself. These spurious signals occur in addition to the desired video signal, and such signals represent a shading effect which have to be compensated for by means of external circuitry and by introducing adequate compensating signals into the camera output to balance out this undesirable shading effect.

Shading effects have been cancelled out by introducing compensating sawtooth and parabola waves, or shading control equals as they are sometimes called, both horizontal and vertical, to achieve the compensating effect desired. However, when varying the amplitude level of the various shading control signals, a corresponding change in pedestal level or black level would be the result. This particular effect would require the operator to continuously reset pedestal level, while adjusting the shading signals. Such inter-action of controls is highly undesirable.

According to this invention the uncompensated signals and the corresponding compensating signals are combined. The compensating signals are however blanked out during the interval, during which the pedestal or black level signals occur, this also being the level at which clamping takes place. This action permits the clamp level to remain constant during changes in the level of compensating signals. By varying such clamp level, a corresponding change in black level will result independent of the control of shading.

An object of this invention is to provide an improved means for transmitting television pictures.

Another object is to provide variable amplitude changes in compensating signals with no corresponding change in pedestal level.

Another object is to provide an improved means for controlling black level.

Other objects will become apparent from a reading of the following specification in which.

Throughout this specification, wherever possible, like numbers will indicate the same component or element.

Figure 1:
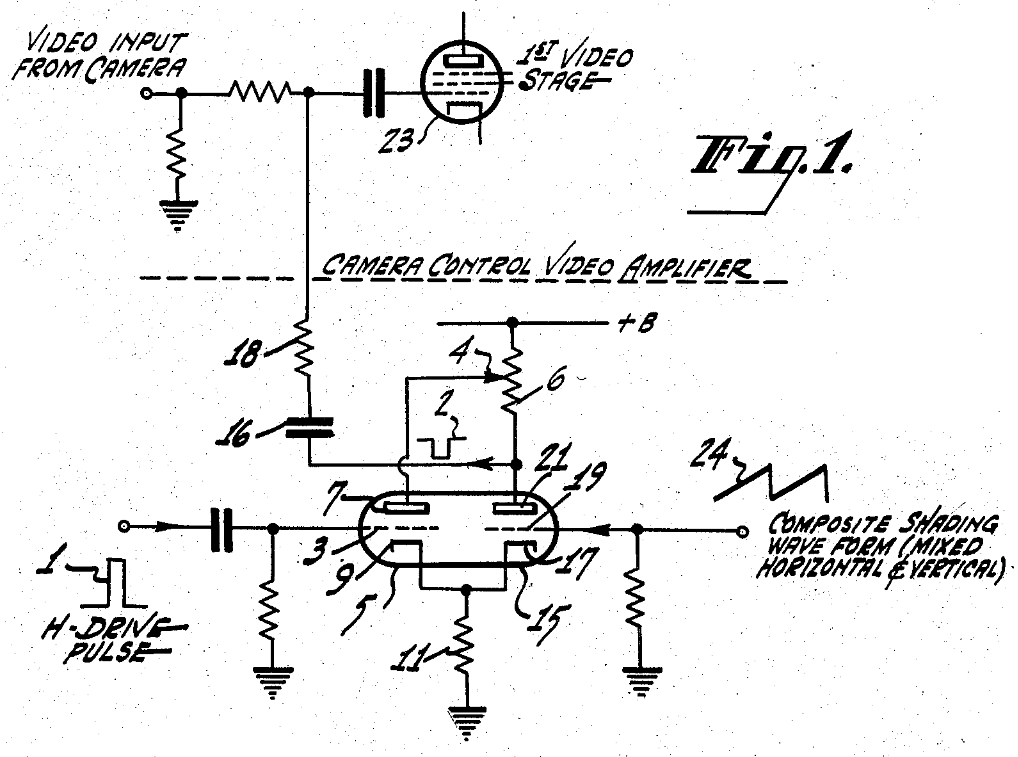
Figure 1 shows circuit diagram for providing means for blanking the shading compensating signals during the fly-back interval of the shading signal.

Figure 1 shows the shading modulator circuit and its connections to an iconoscope camera control amplifier. The input horizontal driving pulse 1, derived from external generating means, is fed to the grid 3 of a first amplifier 5 during the fly-back time of the iconoscope horizontal driving voltage. The first amplifier 5, illustrated as one half of a dual triode tube, is normally biased to cut-off by grid current biasing. Upon the occurrence of the horizontal drive pulse 1, grid current flows thereby charging the input coupling capacitor to the grid 3. As is well known in grid current biasing, upon the termination of the drive pulse 1, the discharge of the coupling capacitor maintains the first amplifier 5 cutoff. For the present, assume the plate 7 of the first amplifier 5 is tied directly to the plate supply voltage. The grid 19 of a second amplifier 15, illustrated as occupying the second half of the dual triode tube, has a composite shading signal 24 consisting of both horizontal and vertical compensating signals applied to it. The composite shading may comprise both sawtooth and parabolic waves in combination. The second amplifier 15 is normally conducting so that the composite compensating signal 24 will normally be amplified. However, upon the application of a horizontal drive pulse 1 to the grid 3 of the first amplifier 5, this normally cut-off amplifier 5 begins to conduct, giving rise to a current flow in cathode 9 through resistor 11. Since the cathodes 9 and 11 of amplifiers 5 and 15 are tied together, a voltage drop across resistor 11 is common to the cathodes 9 and 11 of both tubes. This rise in cathode voltage biases the second amplifier 15 to cut-off so that during retrace time, the second amplifier 15 will be non-conducting. Hence, the second amplifier 15 conducts between horizontal drive pulses, but is blocked during such drive pulses. This action results in the compensating signal 24 being blanked out during this retrace interval, so that in effect the vertical compensating signal will be chopped at a 15,750 cycle rate, thus appearing as modulation riding on top of constant pedestal. This may be made clearer by referring to Figure 2.

Figure 2:
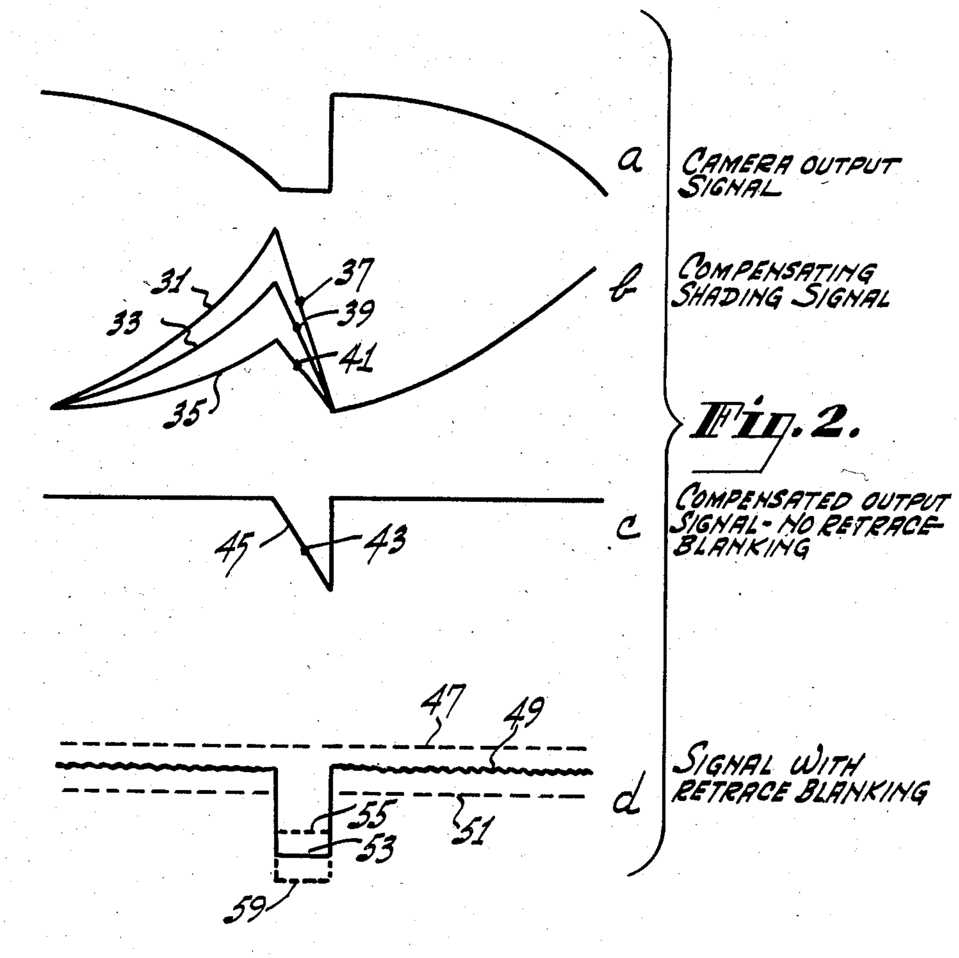
Figure 2 illustrates how clamping levels vary with amplitude changes of the corresponding compensating signal.

Figure 2 shows how the compensating signal appears with and without the chopping of retrace time. Curve A represents the uncompensated output signal from the iconoscope and having the characteristic as shown. By applying compensating signals having a wave shape as shown by curve B, a resultant signal having the linear flat characteristic shown by curve C would be the result. This flat-top represents a constant pedestal or black level upon which the video rides, such that variation in this level which is the overall brightness of the picture, would result in a loss of the proper relationship between the original and the transmitted picture.

Referring again to Figure 2, curve B shows various amplitude changes of the compensating signals 31, 33 and 35 without retrace being blanked or chopped out. The resultant signal after compensation would be that shown by curve C, which represents the sum of curves A and B. The amplitude of the resultant signal 45 during retrace time is not constant but a variable, varying with time in the manner shown. The clamping of a video signal normally takes place during the blanking or retrace time intervals. To avoid streaking and pedestal shifts in the picture, it is necessary to clamp at some definite fixed level or amplitude; that is to say, one that does not shift due to changes in picture information. It is possible for clamping to take place during the retrace or blanking interval, at some point 43 of curve C, Figure 2, without chopping out the retrace interval of the compensating signal curve B of Figure 2. Such technique, however, has the attendant disadvantage such that the amplitude of such compensating signals were altered as represented by points 37, 39 and 41 of curve B, Figure 2, a variation in clamping levels as indicated by these points would result. This variation in clamping levels resulting from variations in amplitude levels of the compensating signals would result in a shift in the pedestal or black level. This shift would give rise to the effect previously described such as a change in brightness, although there would be no increasing change in the picture scene.

To overcome this undesirable effect due to variation of clamp levels, the retrace interval of the compensating signal is chopped or blanked out so that a signal having a characteristic similar to curve D of Figure 2 will be produced. By blanking out the retrace interval of the compensating shading signal represented by curve B and adding to the camera output signal represented by curve A, a resultant signal (curve D) having a constant amplitude response in the flyback or retrace interval will result. Since the flyback interval is chopped out, any amplitude variations of the compensating signal will not affect the clamping level 53 since this clamping level 53 will be completely determined by the cutoff plate voltage of the second amplifier 15 in Figure 1.

Referring again to Figure 1, it was originally pointed out that the plate 7 of the first amplifier 5 was returned directly to the plate supply voltage. When the amplifier tube 5 conducts on receipt of the drive plus 1 the resultant cathode drop across the common cathode resistor 11 causes the second amplifier 15 to be cut off. This results in a sharp rise in plate voltage of the second amplifier tube 15, which rise in voltage is then transmitted to the input of the video amplifier 23 via the coupling condenser 16 and resistor 18. This effectively introduces a large constant pedestal into the video amplifier 23. Although this large pedestal change in and by itself may not be too objectionable, it will nevertheless cause overloading of the video amplifier prior to the effective removal of such signal by subsequent blanking circuits.

This undesirable effect of overloading the video amplifier 23 of Figure 1 by cutoff action of second amplifier tube 15, can be readily cancelled or overcancelled by introducing some of the amplified negative pulses 2 in the plate circuit of the second amplifier 15 by shifting the potentiometer arm 4 of potentiometer 6 away from the plate supply voltage. This action effectively levels out or bucks out the rise in plate voltages due to cutoff action of the second amplifier 15. Over cancellation is possible here since the first amplifier tube 5 is driven from zero bias to grid current conduction by the large drive pulses 1 at its grid, whereas the current in the second amplifier tube 15 is limited by the common cathode resistor 11.

This variation in the degree of pulse cancellation is identical to the variable amplitude and polarity pulse required for black level control and may therefore be used for this purpose.

Referring to Figure 2, curve D, it was previously explained that any changes in amplitude of the compensating signals would result in no effective change in the clamping level 53 of the overall signal so that the black level would remain substantially constant. However, as this clamp level can be adjusted by the potentiometer 6, any variation of this potentiometer 6 will produce a shift in the clamping level such as that shown by levels 55 and 59 of curve D in Figure 2. This, therefore, effectively results in a change in black level.

Figure 3:
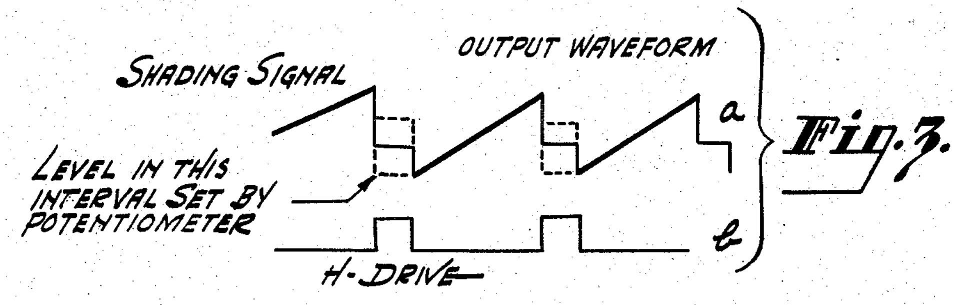
Figure 3 shows the output waveform from the output of the shading control and black level control amplifier.

Figure 3 shows the compensated signal with the corresponding clamping level changes during the blanking interval at the amplifier output. Curve A represents the compensating signal to be applied to the camera controlled video amplifier 23 and curve B the horizontal drive pulses, which gives rise to the chopping action during this interval of drive time.

Having thus described this invention, what is claimed is:

1. A television signal compensating system comprising adding means for additively combining a video signal and a compensating signal, said adding means being connected to receive a said video signal, said video signal having blanking periods, switching means having a switched output connected to said adding means and an input to be switched connected to receive said compensating signal, control means for controlling said switching means for preventing the passage of said compensating signal to said adding means during said blanking periods of said video signal, and for allowing the passage of said compensating signal to said adding means during other periods of said video signal.

2. A system according to claim 1 wherein said adding means comprises a grid controlled electron discharge device, said grid controlled electron discharge device having a grid electrode connected to receive said video signal and connected to said switching means, said control means being adapted to introduce a variable amplitude pedestal into said compensating signal during said blanking periods.

3. A system according to claim 2 wherein said switching means and said control means comprise a first and a second grid controlled electron discharge device each having at least a cathode, a common cathode resistor connected to each of said cathodes, said first grid controlled electron discharge device being connected to receive a pulse signal during said blanking periods of said video signal, said second grid controlled electron discharge device being adapted to be connected to receive and amplify said compensating signal, said first and said second grid controlled electron discharge devices being so-biased that upon the application of said pulse signal to said first grid controlled electron discharge device a cathode potential will develop of such magnitude as to prevent the passage of said compensating signal through said second grid controlled electron discharge device.

4. A television signal compensating system comprising an electron discharge device adapted to be energized, said electron discharge device having current control means, an electronic switching circuit connected to receive a shading control signal, said current control means being connected to said electronic switching circuit and connected to receive a video signal, said video signal having a blanking period, control means for controlling said switching means such as to modify said shading control signal during said blanking periods of said video signal and to allow the passage of said shading control signal unmodified to said current control means during other intervals.

5. A television signal compensating system comprising a first electron discharge device, said first electron discharge device having current control means, a second electron discharge device having current control means, means for applying a shading control signal to said current control means of said second electron discharge device means for developing an output signal which varies as the current in said second electron discharge device, means connecting said output signal to said current control means of said first electron discharge device, means adapted to connect said current control means of said first electron discharge device to receive a video signal, said video signal having a blanking interval, and means for rendering said second discharge device nonconductive during said video signal blanking interval.

6. A system according to claim 1 including means associated with each of said control means and said switching means for applying a variable pedestal to said adding means during said blanking periods.

7. A system for compensating a television video signal having blanking intervals by a compensating signal, said system comprising means for modifying said compensating signal, and means for adding said modified compensating signal to said video signal, said modifying means including a switching means for preventing the passage of said modified compensating signal to said adding means during said blanking intervals.

8. A system according to claim 7 wherein said switching means is adapted to introduce a variable amplitude pedestal into said modified compsensating signal during said blanking intervals to thereby provide a stable black level reference.

References Cited in the file of this patent

UNITED STATES PATENTS

| | | |
|---|---|---|
| 2,166,712 | Bedford | July 18, 1939 |
| 2,403,549 | Poch | July 9, 1946 |

FOREIGN PATENTS

| | | |
|---|---|---|
| 974,578 | France | Oct. 4, 1950 |